April 4, 1967  J. W. GLAZE, JR  3,312,332
CONVEYING MECHANISM FOR A STOCKING BOARDING APPARATUS
Filed April 26, 1965  2 Sheets-Sheet 1

INVENTOR
JOHN W. GLAZE, JR.

BY *Browne, Schuyler & Beveridge*

ATTORNEYS

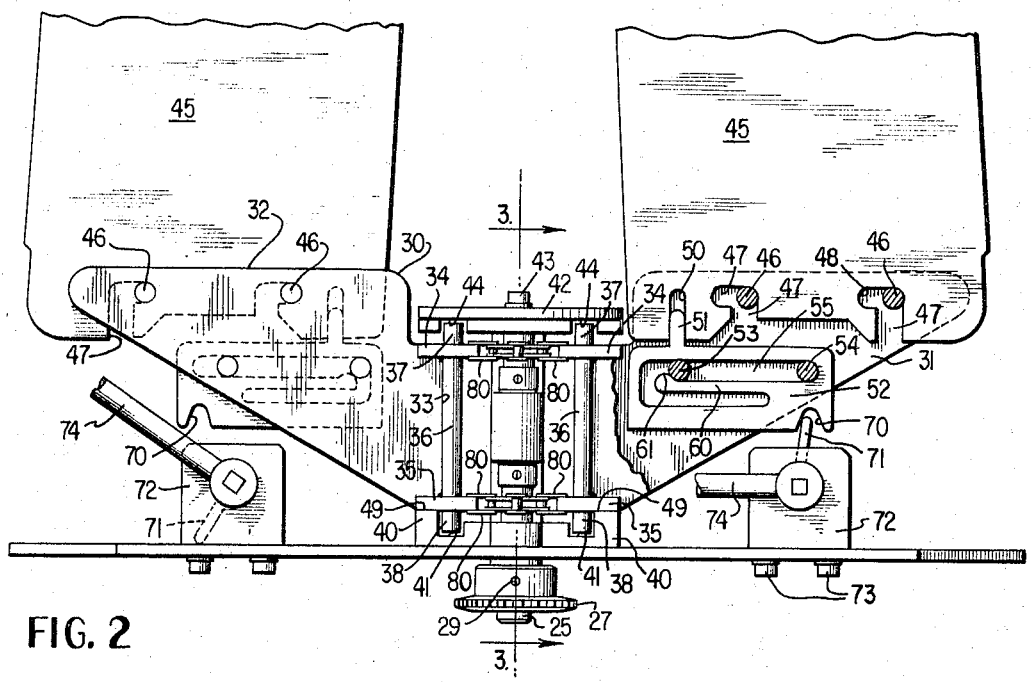

United States Patent Office 3,312,332
Patented Apr. 4, 1967

3,312,332
CONVEYING MECHANISM FOR A STOCKING
BOARDING APPARATUS
John W. Glaze, Jr., Charlotte, N.C., assignor to Autoboard Corporation, Charlotte, N.C., a corporation of North Carolina
Filed Apr. 26, 1965, Ser. No. 450,594
12 Claims. (Cl. 198—131)

This invention relates to stocking handling apparatus, and more particularly to a boarding form conveying mechanism for a stocking boarding apparatus.

It is a primary object of this invention to provide a mechanism for conveying boarding forms through a stocking boarding apparatus.

Another object is to provide a mechanism for conveying a plurality of stocking boarding forms about an endless path through a boarding apparatus at different rates during different portions of the path.

Another object is to provide a mechanism for conveying a plurality of boarding forms about an endless path in closely spaced relation during a major portion of the path and at an increased spacing during the remainder of the path.

Another object is to provide a boarding form conveying mechanism for a stocking boarding apparatus including an improved means for supporting the boarding forms on the conveying mechanism.

The above and other objects are attained in a mechanism for supporting and conveying a plurality of stocking boarding forms around an endless path. The forms are moved around the endless path by an endless chain mounted on and moving over a pair of spaced sprocket wheels, with the chain moving in a substantially straight line between the respective sprocket wheels. A plurality of brackets are mounted on the chain at spaced intervals along the length thereof, with each bracket being adapted to releasably support a single boarding form. The brackets project outwardly from the outer periphery of the endless chain to support the boarding forms for movement along an endless path parallel to and spaced outwardly from the endless chain, with the boarding forms being disposed in substantially parallel side-by-side relation while moving along the straight line portion of the endless chain. The brackets extend outwardly from the chain in fixed angular relation thereto, so that as the portion of the chain having any particular bracket mounted thereon is moving on a curved portion of its path around one of the sprocket wheels, the bracket and the form supported thereby are caused to swing through a 180° arc.

Since the bracket supports the boarding form outwardly from the closed path of the endless chain, the bracket and boarding form will be accelerated as they are swung through the arc, thereby increasing the spacing between successive forms moving on the curved portion of the path, making it possible for an operator to install, remove or inspect a stocking on the individual form as it is swung through the 180° arc. By supporting the boarding form outwardly from the chain a distance substantially greater than the radius of the individual sprocket, the distance between individual forms being swung through the arc will be increased, thereby giving an operator a clear view of the individual forms.

Other objects and advantages of the invention will become apparent from the following specification taken with the drawings, in which:

FIG. 2 is an end elevation view of the conveying mechanism, with parts broken away to more clearly show other parts; and, FIG. 3 is a sectional view taken on line 3—3 of FIG. 2.

Figure 1:
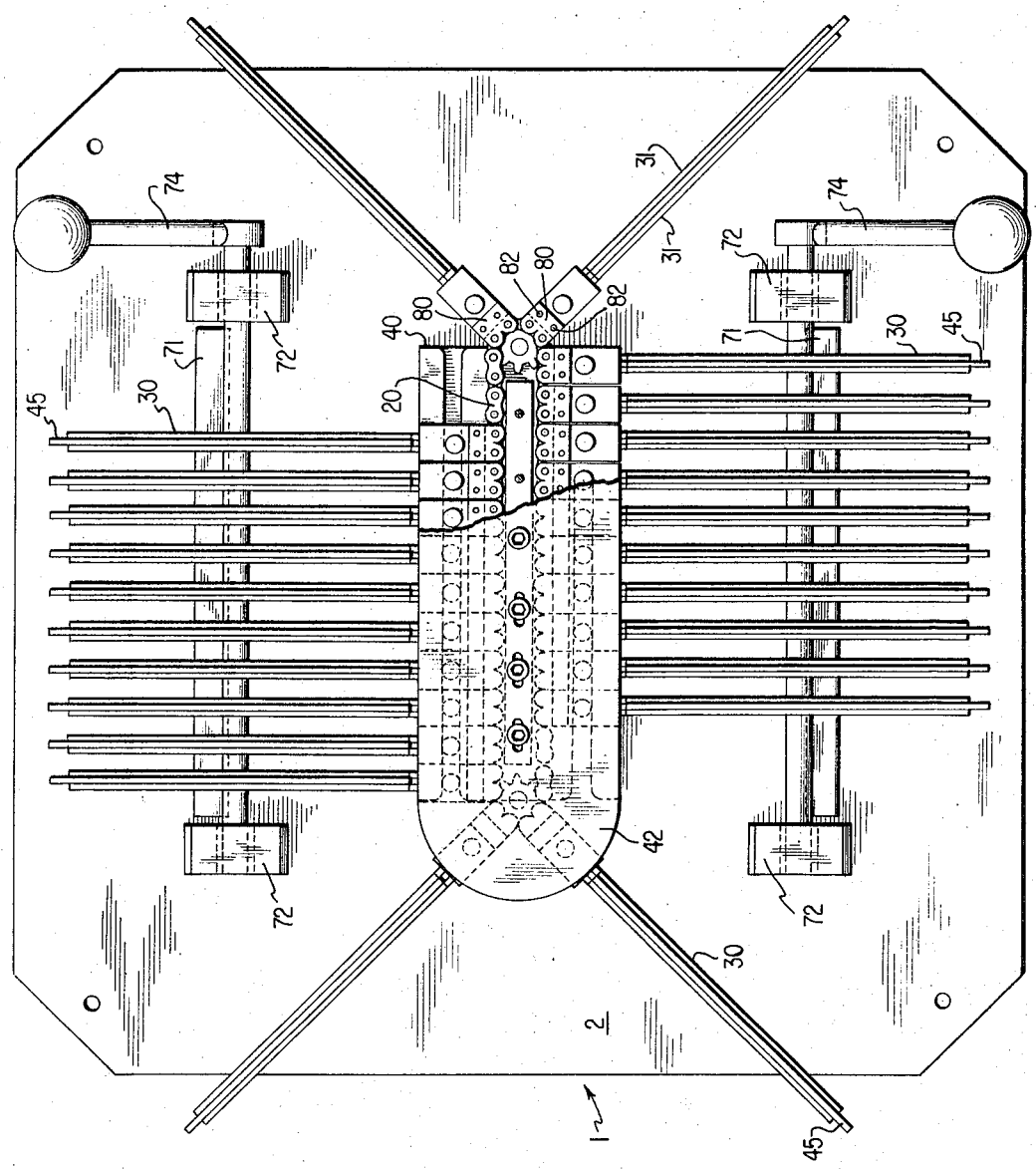
FIG. 1 is a top plan view of a conveying mechanism according to the present invention.

Referring now to the drawings in detail, a boarding form conveying mechanism according to the present invention, illustrated generally by the numeral 1, is shown mounted on a horizontally disposed base plate 2 and includes an elongated generally rectangular bearing block 3 rigidly mounted on the upper surface 4 of plate 2 as by a plurality of cap screws 5. As shown in FIG. 3, bearing block 3 is preferably formed in two segments 6, 7 to permit adjustment of the overall length of the bearing block for a purpose to be more fully described hereinbelow. The segments 6 and 7 are retained in alignment by a pair of guide pins 8 extending therebetween, and the cap screws 5 extending into segment 7 extend through elongated slots 9 in base plate 2 to permit limited movement of segment 7 along surface 4 to adjust the spaced relation between segments 6 and 7.

The bearing block segments 6 and 7 are formed with an axial extension 12 on one end thereof, with the two extensions 12 being disposed on opposite ends of the elongated bearing block 3. Each extension 12 supports a shaft 13 mounted for rotation about a vertical axis in a bearing 14. A first pair of sprocket wheels 15 are rotatably fixed as by pins 16, on the upper ends of the respective shafts 13 for rotation therewith in a first horizontal plane, and a second pair of sprocket wheels 17 are rotatably fixed, as by pins 18, to the lower ends of the respective shafts 13 for rotation therewith in a second horizontal plane.

A first endless chain 20 is positioned over sprocket wheels 15 for rotation therewith, with the portion of the chain intermediate the sprocket wheels extending along the opposed parallel sides of bearing block 3. A second endless chain 21 is mounted on sprocket wheels 17, with the portions of chain 21 intermediate to the sprocket wheels 17 similarly extending along the opposed parallel sides of bearing block 3. It is apparent that chains 20 and 21 may be installed or removed, or the tension therein may be varied by adjusting the relative positions of the segments 6 and 7 of bearing block 3.

Chains 20 and 21 are driven by a stub shaft rotatably fixed onto the lower end of one of the shafts 13. Shaft 24 is journaled for rotation in a bearing 25 mounted in an opening 26 in base plate 2 and has a gear 27 rotatably fixed thereon, as by key 28 and set screw 29, at a point below base plate 2. Gear 27 is adapted to be engaged and driven by suitable means, not shown, to drive the shafts 13 and the sprockets and chain supported thereon.

Referring now to FIGS. 1 and 2 of the drawings, it is seen that a plurality of boarding form supporting brackets 30 are mounted at spaced intervals along chains 20 and 21 for movement therewith around an endless path parallel and spaced outwardly from the path of the chains as they are driven around sprocket wheels 15 and 17. The respective brackets 30 are identical in construction and, accordingly, only one will be described in detail.

Bracket 30 comprises a pair of similar generally triangular shaped, vertically disposed plates 31. The plates 31 have a substantially horizontal upper edge 22 and a substantially vertical side edge 33, and are retained in spaced parallel relation by a pair of vertically spaced flanges 34, 35 rigidly mounted thereon, as by welding, with flanges 34, 35 extending laterally from the vertical edge 33. An elongated guide pin 36 extends through flanges 34 and 35 and is rigidly secured thereto and to the vertical edge 33 of plates 31, as by welding. The upper end 37 of pin 36 projects above a flange 35, and the lower end 38 of pin 36 projects below flange 35, with ends 37 and 38 respectively forming, in effect, upper and lower cam followers to lend support to the bracket 30, as will be more fully explained below.

Alternate links of chains 20 and 21 are formed with a pair of vertically spaced outwardly extending mounting tabs 80 for receiving and supporting the projecting ends of flanges 34, 35. A pair of pins 82 extend through the respective tabs and the associated flange to mount the bracket 30 on the chains in fixed angular relation.

A pair of elongated support rails 40 are mounted on base plate 2 and extend along the longitudinal side edge of bearing block 3. Support rails 40 each have an upwardly directed groove, or cam track 41, formed in the upper surface thereof, with track 41 being positioned parallel to and spaced outwardly and below the straight portion of chain 21 between the two sprocket wheels 17. As best seen in FIG. 1, rails 40 extend along the full length of the straight portion of chain 21, with rails 40 terminating at a point adjacent shafts 13. Similarly, an upper rail 42 is mounted on the top surface of bearing block 3, as by cap screws 43, and projects laterally therefrom along the side edges of the bearing block between the two shafts 13. Rail 42 has an upwardly extending groove 44 formed in and extending upwardly from the lower surface of the projecting portions, one on each side of bearing block 3, and extending the length thereof in spaced parallel relation to the straight portions of chain 20. As bracket 30 moves with chains 20 and 21 along the straight portion of their path parallel to the longitudinal side of bearing block 3, the ends 37 and 38 of pin 36 move into and are guided and supported by cam tracks 44 and 41, respectively. However, as the chain and brackets move around curved portion of their path, the chains are supported by the sprocket wheels so that the additional support of the cam and track are not needed during this segment of the endless path.

In addition to the cam track 41, rails 40 may also include a horizontal surface 49 positioned to engage the bottom surface of flange 35 as the brackets move therealong to lend additional vertical support to the bracket, and thereby relieve the load on chains 20 and 21 during that portion of its travel when the chains are not supported by the sprocket wheels 15 and 17.

Each bracket 30 is adapted to releasably support an individual stocking boarding form 45 for movement about the endless path traversed by the support bracket. The boarding form 45 has its lower end disposed between the parallel plates 31, and is supported therebetween by a pair of laterally spaced rivets, or pins 46 extending between and through the plates 31, near the top edge 32 thereof. As best seen in FIG. 2, boarding form 45 is provided with a pair of slots 47 formed in and extending upwardly from its lower edge in position to receive the two pins 46 when the boarding form is moved downwardly between the two plates 31. Slots 47 are formed with a horizontally extending portion 48 adjacent their upper end in a position to receive a pin 46 upon lateral movement of boarding form 45 to retain the form 45 in position on the bracket 30.

Boarding form 45 is provided with an additional vertically extending notch 50 formed in its bottom edge in position to receive an upwardly extending projection 51 formed on a latch plate 52. Plate 52 is slidably supported between parallel plates 31 by a pair of laterally spaced rivets 53, 54 extending through plates 31 and through an elongated slot 55 in the latch plate. The length of slot 55 is somewhat greater than the distance between rivets 53 and 54, thereby permitting limited sliding movement of the latch plate over the supporting rivets between a locking position and a release position in which the opposed ends of the slot 55 engage the rivets 53 and 54, respectively.

To resiliently resist movement of the latch plate 52 between the locking and the releasing positions, slots 55 is generally C-shaped to form an elongated cantilevered finger portion 60 having an enlarged free end portion 61. Enlarged portion 61 restricts the width of slot 55 to a dimension slightly less than the diameter of rivet 53 between the positions occupied by rivet 53 in the locking and releasing positions, making it necessary to deflect finger 60 downward slightly to move the latch plate between the locking and releasing positions. The resilience of finger 60, acting through enlarge portion 61 in engagement with rivet 53, resiliently resists movement between the locking and releasing positions.

To install a boarding form 45 on a support bracket 30, latch plate 52 is moved to the releasing position and the lower portion of a boarding form is manually inserted between the plates 31, with slots 47 extending over pins 46 and notch 50 telescopingly receiving projection 51. Latch plate 52 is then moved to the locking position, with finger 51 positioned in notch 50 moving form 45 laterally therewith to position pins 46 within the extensions 48 of slots 47. Since latch plate 52 is releasably retained against lateral movement by the enlarged end portion 61 of resilient finger 60 acting on pin 53, the boarding form 45 will be positively retained in position until latch plate 52 is again moved to the releasing position.

To facilitate moving the latch plate between the releasing and locking position, plate 52 includes a portion projecting outwardly from between plates 31. A V-shaped notch 70 is formed in and extends upwardly from the lower edge of the projecting portion of latch plate 52 in position to be engaged by a pivotally mounted actuator 71. Actuator 71 is mounted for rotation in a pair of bearing blocks 72 which, in turn, are mounted on base plate 2, as by cap screws 73. Lever means, such as handle 74, is provided to manually rotate actuator 71 into engagement with notch 70 to move latch plate 52 between the locking and releasing positions, as is illustrated most clearly in FIG. 2 of the drawings.

In operation, similar boarding forms 45 will normally be employed on each of the respective brackets 30 during the treatment of a particular style or size of stockings, it being necessary to change the boarding forms only when the style or size of stocking to be treated is changed. Thus, all of the boarding forms 45 are normally changed at the same time, and, to facilitate removal and installation of a complete set of boarding forms, actuator 71 preferably extends along the full length of the straight portion of the endless path, thereby making it possible to simultaneously release or lock all of the boarding forms 45 supported by brackets 30 positioned along this straight portion of the endless path. However, in the event that it is desirable to change only a single boarding form 45, each of the forms along the straight portion of the path is released and the desired form or forms are changed, leaving the remainder of the forms to rest upon the ends 46. When the desired change has been made, all the forms are again locked in position by a single actuation of the lever 74.

From the above, and as is seen in FIG. 1, the support bracket 30 and the boarding forms 45 are normally disposed in relatively close side-by-side relation during movement along the straight portion of the endless path. This close spacing of the boarding forms is desirable during the treatment of stockings disposed on the boarding forms in that it permits a maximum number of stockings to be treated simultaneously within a given size of treatment chamber. However, this close spacing is undesirable while the stockings are being installed on or removed from the boarding forms, or during inspection of stockings previously installed on the boarding forms, as the stockings must be positioned on and removed from the individual forms manually, and an unobstructed view of the form is necessary to permit visual inspection. In the present invention, maximum spacing between successive forms is provided at the operator's station by swinging the individual forms through a relatively long arc as the length of chain supporting the individual form is moved around the respective sprocket wheels. By supporting the boarding form outwardly from the chain a relatively great distance as compared to the radius of the sprocket wheel, the distance between successive forms moving on the curved portion of the track is greatly increased, giving an operator an opportunity to work upon an individual form as the form swings through the arcuate portion of its path. Further the boarding form presents alternate sides to an operator as they swing through the 180° arc, giving the operator a clear, unobstructed view of both sides of the form, thereby facilitating visual inspection of stockings disposed on the forms.

It is apparent that for a given radius of sprocket wheel, the spacing of the boarding forms along the length of the endless chains will determine the number of brackets 30 which may be moving on a curved portion of the track. Thus, if the spacing of successive brackets is equal to the radius of the sprocket wheels, it is possible to have a maximum of three brackets moving around the 180° curved portion of the chain on a single sprocket at any one time, since the cord length and the radius of a 60° arc are equal.

Again, as illustrated in FIG. 1, it may be desirable to provide spaces along the length of chains 20, 21 which have no brackets 30 supported thereon. This break in the continuity of the procession of boarding forms passing an operator's station will greatly facilitate counting or grouping of stockings which are normally handled in groups of one dozen. Further, the elimination of a bracket from selected one of the links makes it possible to position all of the forms along the straight portion of the endless path so that, if desired, the conveying mechanism may be stopped with all of the boarding forms in the closely spaced side-by-side relation along the straight portion of the path which will normally be the portion of the path during which the stockings are treated on the forms.

While I have disclosed and described a preferred embodiment of my invention, I wish it understood that I do not intend to be restricted solely thereto, but that I do intend to cover all embodiments thereof which would be apparent to one skilled in the art and which come within the spirit and scope of my invention.

I claim:

1. In a stocking boarding apparatus, a boarding form conveying mechanism comprising endless chain conveying means, means driving said chain conveying means around a closed path including a relatively straight segment and a curved segment, a plurality of supporting brackets mounted in spaced relation along said chain conveying means for movement therewith around said closed path, means on each of said brackets for supporting a boarding form spaced outwardly from said endless chain conveying means, means for releasably retaining the boarding forms on said brackets, said retaining means including locking means movable between a locking position engaging and retaining the forms on said bracket and a releasing position releasing said forms, and means successively swinging each of said brackets and the form supported thereby through an arc while moving past said curved portion of said closed path to increase the spacing between successive forms moving on said curved portion.

2. The boarding form conveying mechanism as defined in claim 1 further including means operable to simultaneously move the locking means on a plurality of said brackets between said locking and releasing positions.

3. The boarding form conveying mechanism as defined in claim 1 including means resiliently resisting movement of said locking means between said locking and releasing positions.

4. In a stocking boarding and inspecting apparatus, a conveying mechanism for conveying boarding form through a treatment area and past a boarding and inspecting station, said conveying mechanism comprising, endless chain conveying means, means driving said chain around a closed substantially horizontal path including a relatively long straight segment through said treatment area and a curved segment past said boarding and inspecting station, a plurality of support brackets mounted on said chain in closely spaced relation therealong and projecting laterally therefrom for movement therewith around said closed path, means on each of said brackets for supporting a substantially flat elongated stocking boarding form spaced outwardly from said closed path with the longitudinal axis of said form extending in a generally vertical direction, said form being supported in substantially parallel side-by-side relation while moving through said treatment area, and means successively swinging each of said brackets and the forms supported thereby through an arc while moving past said curved portion of said closed path to increase the spacing between successive forms and to successively present opposite flat sides of said forms to permit visual inspection of stockings positioned thereon as said forms are moved around said curved portion.

5. The stocking boarding and inspecting apparatus defined in claim 4 further including fixed guide means mounted in spaced relation to said straight segment, and cam follower means on said brackets in position to engage said guide means as said brackets are moved along said straight segment by said chain.

6. The invention according to claim 5 wherein said guide means includes a pair of vertically spaced cam tracks, said cam follower means engaging each of said cam tracks to assist said chain in supporting said brackets and the form supported thereby.

7. The boarding form conveying mechanism as defined in claim 4 wherein said supporting brackets are mounted in fixed angular relation to said chain.

8. The boarding form conveying mechanism as defined in claim 7 wherein the radius of curvature of said curved segment of said closed path is substantially equal to the spacing between successive brackets mounted on said chain.

9. The boarding form conveying mechanism as defined in claim 4 wherein said supporting brackets are mounted in fixed angular relation to said chain.

10. The boarding form conveying mechanism as defined in claim 9 wherein the radius of curvature of said curved segment of said closed path is no greater than the spacing between successive brackets mounted on said chain.

11. The boarding form conveying mechanism as defined in claim 4 further including track means positioned in spaced relation to said closed path, and means on each of said brackets engaging said track means throughout at least a major portion of said path, said track engaging means cooperating with said chain to support said brackets.

12. The boarding form conveying mechanism as defined in claim 4 wherein said endless chain conveying means includes a pair of endless chains mounted for movement in spaced parallel planes around said endless path, and said supporting brackets are mounted to each of said chains.

References Cited by the Examiner
UNITED STATES PATENTS

| | | | |
|---|---|---|---|
| 2,057,950 | 10/1936 | Howison | 198—181 |
| 2,761,221 | 9/1956 | Berry | 223—76 X |
| 3,069,787 | 12/1962 | Baskin | 198—131 X |

EVON C. BLUNK, *Primary Examiner.*

EDWARD A. SROKA, *Examiner.*